United States Patent
Tsubaki et al.

(10) Patent No.: US 7,341,478 B2
(45) Date of Patent: Mar. 11, 2008

(54) ELECTRIC POWER SUPPLY DEVICE FOR SLIDE STRUCTURE

(75) Inventors: Akira Tsubaki, Shizuoka (JP); Takahiro Iwasaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/812,593

(22) Filed: Jun. 20, 2007

(65) Prior Publication Data

US 2007/0243729 A1    Oct. 18, 2007

Related U.S. Application Data

(62) Division of application No. 11/146,062, filed on Jun. 7, 2005, now Pat. No. 7,252,541.

(30) Foreign Application Priority Data

Aug. 6, 2004  (JP) ............... 2004-230588
Nov. 30, 2004 (JP) ............... 2004-345599

(51) Int. Cl.
*H01R 13/72* (2006.01)
*H02G 3/04* (2006.01)

(52) U.S. Cl. .................... 439/501; 174/72 A
(58) Field of Classification Search ................ 439/501, 439/502; 174/72 A, 69, 72 C, 70 R
See application file for complete search history.

(56) References Cited

U.S. PATENT DOCUMENTS

| | | | |
|---|---|---|---|
| 5,016,345 A | 5/1991 | Aligue et al. | .................. 29/742 |
| 5,951,093 A | 9/1999 | Proschek | |
| 7,053,306 B2 * | 5/2006 | Tsubaki et al. | ........... 174/72 A |
| 7,057,110 B2 * | 6/2006 | Tsubaki et al. | ........... 174/72 A |
| 7,265,294 B2 * | 9/2007 | Tsunoda et al. | ........... 174/72 A |
| 2004/0017648 A1 | 1/2004 | Tsubaki | ..................... 361/601 |
| 2005/0062310 A1 | 3/2005 | Kida et al. | ..................... 296/56 |
| 2006/0021781 A1 | 2/2006 | Tsubaki et al. | ........... 174/72 A |

FOREIGN PATENT DOCUMENTS

| | | |
|---|---|---|
| DE | 29 03 430 A1 | 8/1980 |
| DE | 19835579 A1 | 2/2000 |
| GB | 2 340 315 A | 2/2000 |
| GB | 2 408 498 A | 6/2005 |
| JP | 11-342807 | 12/1999 |
| JP | 2003-306089 | 10/2003 |

* cited by examiner

*Primary Examiner*—Chandrika Prasad
(74) *Attorney, Agent, or Firm*—Kratz, Quintos & Hanson, LLP

(57) ABSTRACT

The electric power supply device for a slide structure includes: a casing which receives a wiring harness folded in a U-shape; a slider which holds a movable end of the wiring harness and slidably engages with the casing; and a harness supporting member which slidably contactually engages with a folded part of the wiring harness and includes a supporting plate body for supporting an inner side face of the wiring harness. The device prevents the wiring harness from hanging down or bending when the slide structure is moved, so that a smooth and secure slide operation is attained.

5 Claims, 14 Drawing Sheets

ELECTRIC POWER SUPPLY DEVICE FOR SLIDE STRUCTURE

This application is a Divisional of prior application Ser. No. 11/146,062, filed on Jun. 7, 2005 now U.S. Pat. No. 7,252,541, which is hereby incorporated by reference.

BACKGROUND OF THE INVENTION (1) Field of the Invention

The present invention relates to an electric power supply device for a slide structure, which securely prevents a long wiring harness arranged in a casing by being folded in a U-shape from being bent, coping with a long-sliding-type slide structure such as a slide door and slide seat of a motor vehicle.

(2) Description of the Related Art

FIG. 1 shows an example of a conventional electric power supply device as disclosed in Japanese Patent Application Laid-Open No. H11-342807.

An electric power supply device 61 is mounted on a slide door of a motor vehicle and includes a long casing 63 for receiving a flat wiring harness 62 by folding it in a U-shape, a flexible reinforcing plate 64 provided on an outer surface of the flat wiring harness 62, a slider 65 provided on a movable end of the flat wiring harness 62, and a rail 66 for slidably engaging with the slider 65.

The reinforcing plate 64 is made of a thin steel material and sticks to a magnetized wall 67 of the casing 63 so as to prevent the flat wiring harness 62 from hanging down. The movable end of the flat wiring harness 62 is connected to a wiring harness 68 at the slider 65, while a fixed end of the flat wiring harness 62 is connected to a wiring harness 69 on the side of the slide door.

When the slide door is opened or closed, the slider 65 moves back and forth along the rail 66, while the flat wiring harness 62 moves back and forth integrally with the slider 65 as being bent in a U-shape so as to absorb a stroke of opening and closing slide door. Thereby, electric power or electric signal is always supplied from the body-side of the vehicle to auxiliary machines of the slide door.

However, as for the conventional electric power supply device 61 as described above, since the flat wiring harness 62 is used as a wiring harness, the number of circuits or supplying current is limited. Further, since the reinforced plate 64 made of steel material is used and the wall 67 of the casing 63 is magnetized to make the reinforced plate 64 adhered to the wall 67 magnetically, causing a complicated structure and increase in cost.

Therefore, instead of the flat wiring harness 62, an electric power supply device (not shown) has been proposed, in which device a normal wiring harness having a cross section of a round shape or rectangular shape is used for preventing the wiring harness from hanging down due to its stiffness.

However, as for the electric power supply device described above, if the slide stroke is short, it works well, but on the other hand, if the slide stroke is long as seen in a case of an electric power supply device 71 for a long slide door or long slide seat of a motor vehicle as shown in FIGS. 16-18, when the slide structure such as the slide door or slide seat moves, as shown in FIG. 17, the wiring harness 72 hangs down or bends during the movement, and when the wiring harness 72 is being slid further, as shown in FIG. 18, the wiring harness 72 is folded repeatedly, causing that the wiring harness 72 can not be slid further. Here, in FIG. 16, the reference numeral 73 denotes the slider and 74 denotes the casing.

SUMMARY OF THE INVENTION

It is therefore an objective of the present invention to solve the above problem and to provide an electric power supply device for a slide structure, which prevents the wiring harness from hanging down or bending when the slide structure such as the long slide door or long slide seat is moved, thereby enabling a smooth and secure slide operation.

In order to attain the above objective, the present invention is to provide an electric power supply device for a slide structure including:

a casing which receives a wiring harness folded in a U-shape;

a slider which holds a movable end of the wiring harness and slidably engages with the casing; and a harness supporting member which slidably contactually engages with a folded part of the wiring harness and includes a supporting plate body for supporting an inner side face of the wiring harness.

With the construction described above, the wiring harness is folded in a U-shape in the casing, a part of the harness supporting member slidably contactually engages with the folded part of the wiring harness, the supporting plate body of the harness supporting member comes in contact with the inner side face of the wiring harness, the wiring harness moves integrally with the slider, and the harness supporting member moves in a moving direction of the slider integrally with the wiring harness by a distance, which is half of a distance that the slider moves. The wiring harness is stably supported by the supporting plate body with surface contact, line contact or a plurality of point contacts when the slide moves, thereby preventing the wiring harness from hanging down or being bent, so that the slider can smoothly move without obstruction. The wiring harness consists of a part that continues to the slider and another part that continues to the folded part.

With the construction described above, since the supporting plate body of the harness supporting member comes in contact with the wiring harness for a long distance so as to prevent the wiring harness from hanging down or being bent, therefore the wiring harness never buckles in the casing when the slider moves for a long distance, thereby enabling a smooth long sliding action and improving reliability of constant electric power supply to a long sliding-type slide structure.

Preferably, the supporting plate body slidably engages with the casing.

With the construction described above, the supporting plate body can smoothly move back and forth along the casing with being positioned stably. The supporting plate body is prevented from being inclined and being shifted, allowing the supporting plate body to support the wiring harness securely.

Preferably, the device further includes a guiding part located in the proximity of a wall of a short side of the casing, wherein the guiding part slidably engages with a slide engaging part of the harness supporting member.

With the construction described above, for example, when the casing is affected by an external force which presses the casing in the thickness direction of the casing or when a wall of a long side of the casing is inwardly bent and deformed, since the guiding part and the slide engaging part are provided in the proximity of a wall of a short side of the casing (i.e. on a wall of a short side or in the proximity of a wall of a short side of the casing), therefore the guiding part or the slide engaging part is never affected by an external force or an influence of bending, allowing the sliding action between the guiding part and the slide engaging part to be carried out smoothly with small friction.

Even when the casing is affected by an external force or deformation in its collapsing direction, the sliding action of the harness supporting member can be carried out smoothly without obstruction.

Preferably, the harness supporting member includes a sliding part in the proximity of a wall of a short side of the casing, wherein the sliding part slidably contacts with an inner wall face of the casing.

With the construction described above, for example, when the casing is affected by an external force which presses the casing in the thickness direction of the casing or when a wall of a long side of the casing is inwardly bent and deformed, since the sliding part of the harness supporting member is placed in the proximity of the wall of the short side of the casing, the sliding part is never affected by an external force or an influence of bending, allowing the sliding action between the sliding part and the inner wall face of the casing to be carried out smoothly with small friction.

Even when the casing is affected by an external force or deformation in its collapsing direction, the sliding action of the harness supporting member can be carried out smoothly without obstruction.

Preferably, a part that slidably contactually engages with the folded part of the wiring harness consists of a pair of guiding plates.

With the construction described above, when the slider moves, the folded part of the wiring harness smoothly moves between the pair of the guiding plates and presses one of the guiding plates in a moving direction of the slider, so that the harness supporting member is moved in the moving direction of the slider by a distance that is half of a distance that the slider moves.

With the construction described above, when the slider moves, the harness supporting member can be moved correctly and smoothly, allowing the sliding action of the slider to be carried out smoothly.

Preferably, a part that slidably contactually engages with the folded part of the wiring harness consists of a pulley and at least one small roller facing with the pulley.

With the construction described above, when the slider moves, the folded part of the wiring harness smoothly moves between the pulley and the small roller and pressing the pulley or the small roller in the moving direction of the slider, so that the harness supporting member is moved in the moving direction of the slider by a distance that is half of a distance that the slider moves. Here, the number of the small roller(s) may be one or more.

With the construction described above, when the slider moves, the sliding friction between the slider and the folded part of the wiring harness is reduced, so that when the slider moves, the harness supporting member can be moved correctly and smoothly, allowing the sliding action of the slider to be carried out smoothly.

Preferably, a part that slidably contactually engages with the folded part of the wiring harness consists of a pulley and a guiding plate facing with the pulley.

With the construction described above, when the slider moves, the folded part of the wiring harness smoothly moves between the pulley and the guiding plate and pressing the pulley or the guiding plate in the moving direction of the slider, so that the harness supporting member is moved in the moving direction of the slider by a distance that is half of a distance that the slider moves.

With the construction described above, when the slider moves, the sliding friction between the slider and the folded part of the wiring harness is reduced, so that when the slider moves, the harness supporting member can be moved correctly and smoothly, allowing the sliding action of the slider to be carried out smoothly.

Preferably, an extension resilient member is arranged between the supporting plate body and the slider.

With the construction described above, when the slider moves, the extension resilient member is pulled and extended while the extension resilient member resiliently biases the harness supporting member in the moving direction of the slider, a part slidably contactually engaged of the harness supporting member presses the folded part of the wiring harness in the moving direction of the slider, so that the wiring harness is maintained in its fully extended condition between the slider and the part slidably contactually engaged.

With the construction described above, since the extension resilient member biases the harness supporting member in the moving direction of the slider so as to maintain the wiring harness in its fully extended condition, therefore the wiring harness is securely prevented from hanging down or being bent.

Preferably, an outer periphery of the wiring harness is covered with a net tube that comes in point contact or line contact with the supporting plate body.

With the construction described above, when the slider moves, the net tube made of synthetic resin smoothly slidingly comes in contact with the supporting plate body of the harness supporting member and the guiding plate with small frictional resistance due to a small contact surface such as a point contact surface or line contact surface. A plurality of electric wires may be directly covered with the net tube as a protective tube for the wiring harness, or alternatively, a corrugated tube may be covered with the net tube.

With the construction described above, the net tube reduces the frictional resistance with respect to the supporting plate body, allowing the wiring harness to extend or shrink smoothly.

Preferably, the casing includes a narrow part and a wide part, a part that slidably contactually engages with the folded part of the wiring harness is located in the wide part, and the supporting plate body can enter into the narrow part.

With the construction described above, the supporting plate body enters into the narrow part of the casing together with the wiring harness so as to stably support the wiring harness in the narrow part, thereby securely preventing the wiring harness from being bent in the narrow part. In the narrow part, the wiring harness can be supported without large bending on the inner wall face of the narrow part as well as on the supporting plate body. The narrow and wide parts extend the whole length of the casing, facilitating the long sliding action.

With the construction described above, since the narrow part, which supports the wiring harness together with the supporting plate body or with the supporting plate body and the inner wall face of the casing, is provided, so that the whole length of the casing is extended, facilitating the long sliding action.

DESCRIPTION OF THE PREFERRED EMBODIMENTS

In the following, the preferred embodiments of the present invention will be explained with reference to the attached drawings.

Figure 1:
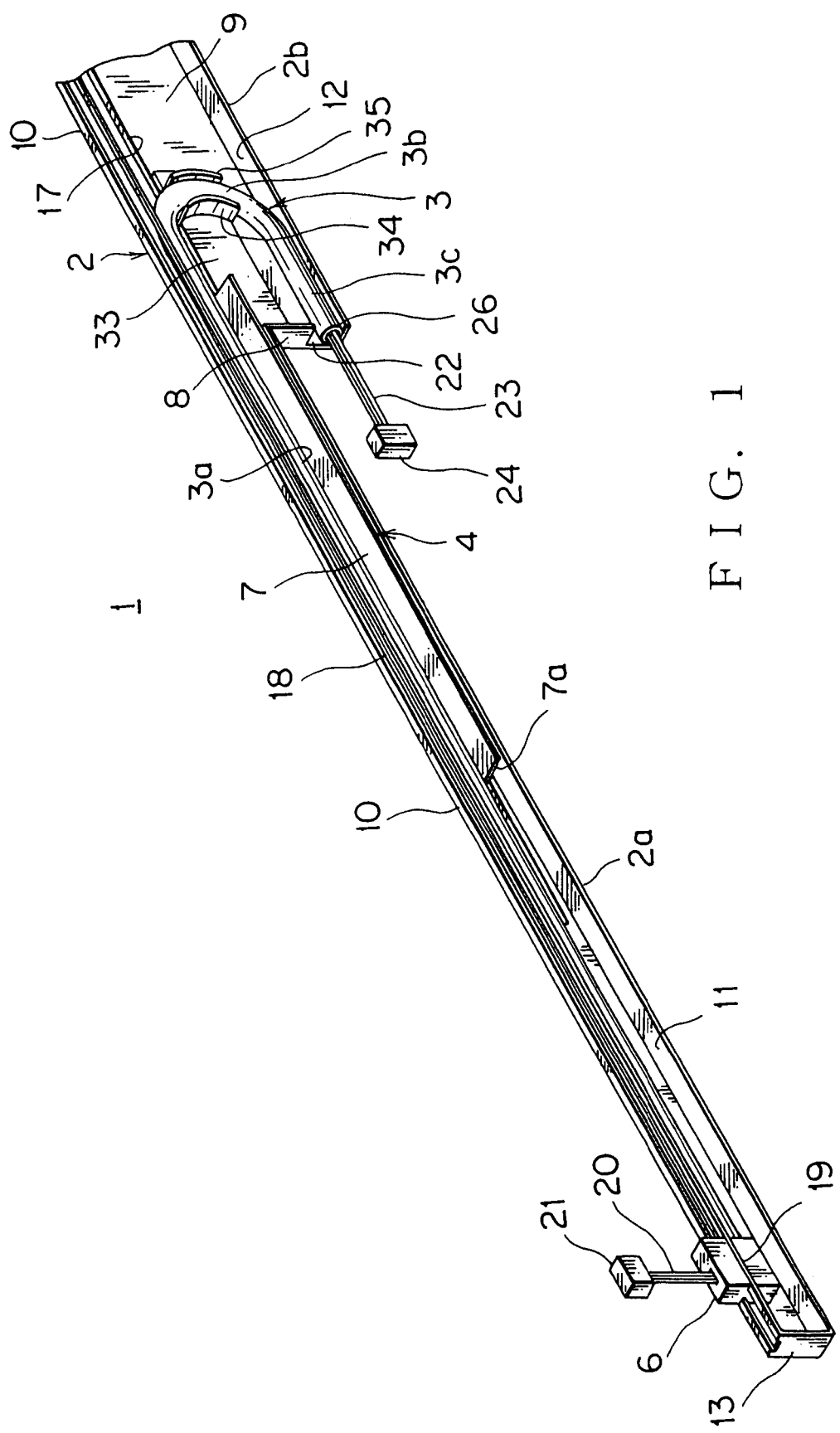
FIG. 1 is a perspective view of an electric power supply device for a slide structure according to the first preferred embodiment of the present invention when the slider is located at a forward end position.
Figure 2:
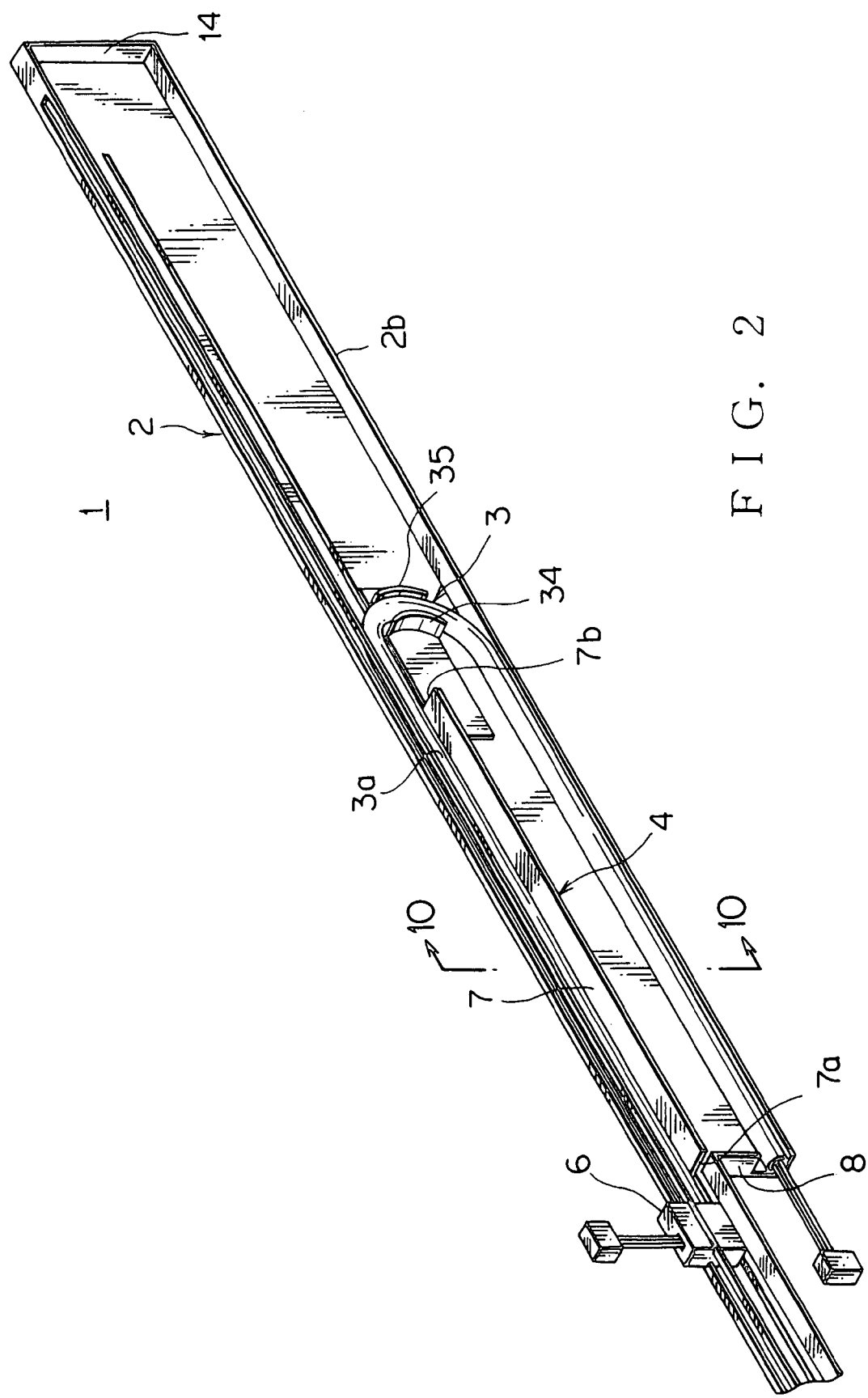
FIG. 2 is a perspective view of the electric power supply device for a slide structure according to the first preferred embodiment when the slider is located at an intermediate position.
Figure 3:
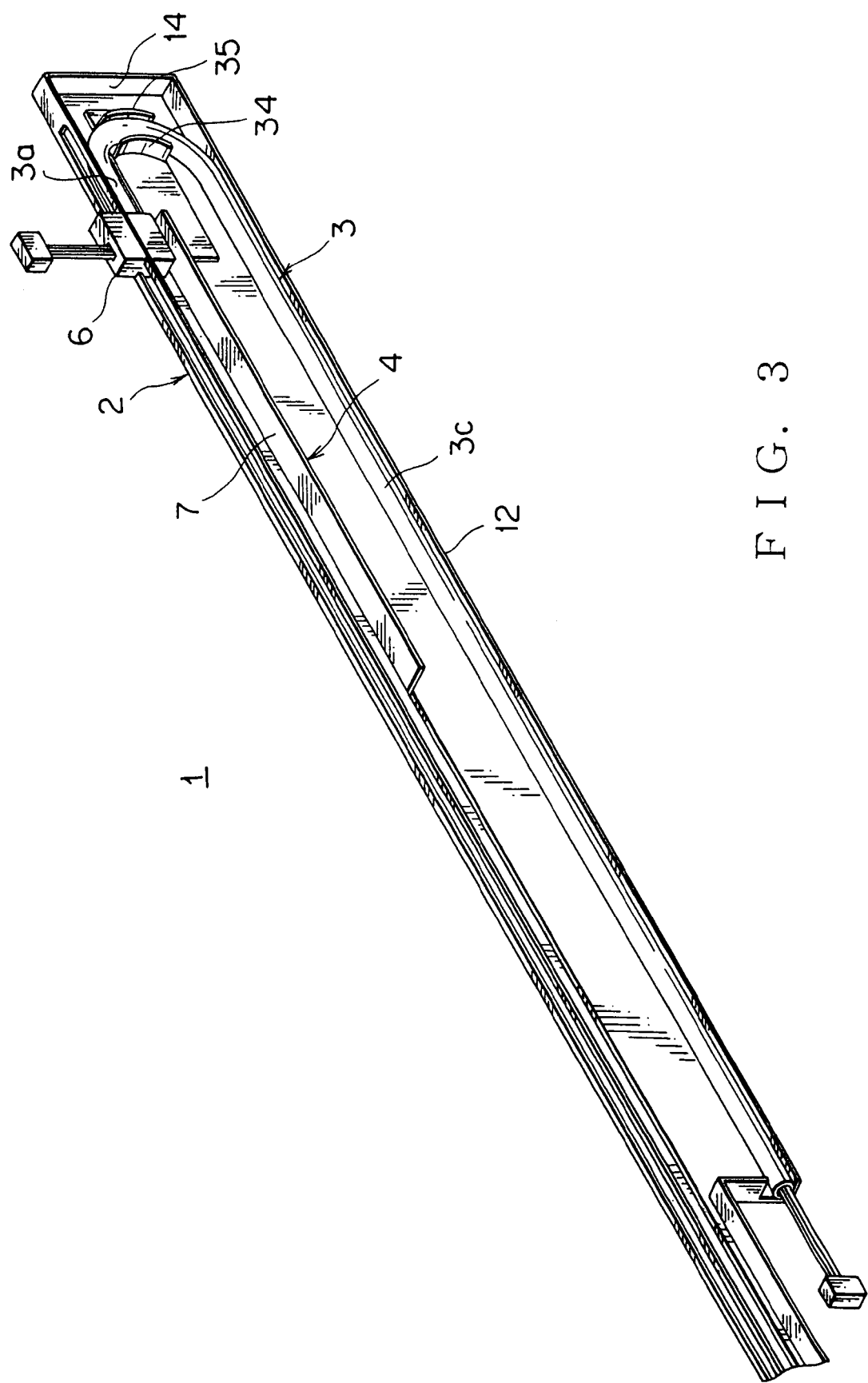
FIG. 3 is a perspective view of the electric power supply device for a slide structure according to the first preferred embodiment when the slider is located at a backward end position.

FIGS. 1-3 illustrate the first preferred embodiment of an electric power supply device for a slide structure according to the present invention.

An electric power supply device 1 for a slide structure includes: a long casing; a wiring harness 3 having a round or elliptic shape in its cross section to be received in the casing being bent in a U or J-shape; a slider 6 which holds an end (movable end) of the wiring harness 3 and is set slidable in the longitudinal direction of the casing along the casing; and a harness supporting member 4 which slidably contactually engages with a bent part (folded part) 3b of the wiring harness 3 and is set slidable along the casing with holding the wiring harness 3 with surface contact or line contact.

The casing includes a casing body 2 and a cover (not shown in the figure) both made of synthetic resin or metal, wherein the casing body 2 includes a narrow part 2a in a front half and a wide part 2b that continues to the narrow part 2a through an intermediate step part 8. The cover has a plate-shape, which covers an opening on the front side of the casing body 2. The casing body 2 and the cover are fixed to each other with fixing means such as a locking projection and an engaging recess or fastening means such as a bolt and a nut.

The casing body 2 includes a base wall 9 and respective walls 10-14 as peripheral walls rising up around the base wall 9. The base wall 9 has a narrow part of its front half and a wide part of its rear half. A long groove or long hole is provided as a guiding part 17 for slidably engaging both side ends of a supporting plate body 7 of the harness supporting member 4 therewith in a range from a middle position of the narrow part to the rear end-side of the wide part of the base wall 9 and the cover (not shown in the figure). The guiding part 17 is situated straight from the lower half of the narrow part 2a to the upper part of the wide part 2b.

As shown in FIG. 1, an upper wall 10 of the casing body 2 is provided with a slit-shaped long hole as a guiding part 18 for slidably guiding the slider 6, wherein a groove 19 of the slider 6 slidably engages with the guiding part 18, the groove 19 being situated at a middle position in the height direction of the slider 6, and an upper half of the slider 6 is exposed to the outside of the casing body 2 while a lower half of the slider 6 is positioned in the narrow part 2a of the casing body 2. A harness part 20 on the movable side of the wiring harness 3 is bent in a L-shape and guided through the slider 6 and a connector 21 for connection use is formed at an end of the harness part 20.

The narrow part 2a of the casing body 2 includes a lower wall 11 that continues to the step part 8, a front end wall 13, a base wall and an upper wall 10. The wide part 2b of the casing body 2 includes a lower wall 12, an front end wall situated on the side of the step part 8, a rear end wall 14 (see FIG. 2), a base wall 9 and the upper wall 10. The base wall 9 and the upper wall 10 extends with the respective same planes in the narrow part 2a and the wide part 2b.

As shown in FIG. 1, at the forward end position of the slider 6, the wiring harness 3 is arranged along an inner surface of the upper wall 10 starting from the slider 6 over a range from a front end of the narrow part 2a to a front end of the wide part 2b of the casing body 2, stably supported by the harness supporting member 4 without being bent with surface contact or line contact, arranged along the lower wall 12 being bent in a U-shape in the proximity of the front end of the wide part 2b, and guided to the outside from an opening 22 of the wall 8 of the step.

As shown in FIG. 1, the harness supporting member 4 includes: the horizontal supporting plate body 7 having a rectangular shape or a band plate-shape; a connecting plate 33 continuing to the supporting plate body 7 vertically at a rear end of the supporting plate body 7; and a pair of guiding plate 34, 35 each having an arc shape facing to each other, which guiding plates are projectingly formed on an inner surface of a rear end part of the connecting plate 33.

A lower side surface (inner side surface) of an upper part (concave part) 3a of the wiring harness 3 is supported by an upper side surface (outer side surface) of the supporting plate body 7 with surface contact or line contact in the longitudinal direction. A bent part 3b of the wiring harness 3 slidably contactually engages with between the pair of the guiding plates 34, 35 being put therebetween. The harness supporting member 4 is movable integrally with the bent part 3b of the wiring harness 3 in the same direction. The connecting plate 33 slides contacting with an inner surface of the base wall 9 of the casing body 2 so as to stabilize a posture of the harness supporting member 4.

The wiring harness 3 includes a known corrugated tube 26 (see FIG. 13) made of synthetic resin on an outer periphery thereof. The corrugated tube 26 includes parallel and alternating ridges 26a and grooves 26b in the peripheral direction so as to have good flexibility. The corrugated tube 26 is provided in a range from the slider 6 to the opening 22 of the casing body 2. A plurality of insulating coated electric wires are received within the corrugated tube 26, thereby constructing the wiring harness 3.

If the wiring harness 3 includes the corrugated tube 26 having a round shape in section, the corrugated tube 26 is stably supported by the supporting plate body 7 of the harness supporting member 4 with line contact in the longitudinal direction. If the wiring harness 3 includes the corrugated tube 26 having a elliptic shape in section, the corrugated tube 26 is stably supported by the supporting plate body 7 of the harness supporting member 4 with surface contact. If the wiring harness 3 is constructed by winding up a plurality of electric wires with a tape without having the corrugated tube 26, the wiring harness 3 is stably supported by the supporting plate body 7 of the harness supporting member 4 with line contact or surface contact.

As shown in FIG. 1, at the forward end position of the slider 6, the supporting plate body 7 of the harness supporting member 4 is positioned on a rear half of the upper side part 3a of the wiring harness 3 so as to stably support the upper side part 3a of the wiring harness 3 without hanging down and bending of the wiring harness 3. A front half of the upper side part 3a of the wiring harness 3 is not directly supported by the harness supporting member 4. However, the front half is supported between the slider 6 and a front end 7a of the harness supporting member 4, thereby preventing the wiring harness 3 from hanging down and bending.

Even if the upper side part 3a of the wiring harness 3 hangs down or bends, since the wiring harness 3 is supported by the lower wall 11 of the narrow part 2a of the casing body 2 without hanging down greatly, there is no problem. Accordingly, the length of the narrow part 2a of the casing body 2 can be extended to a desired size, thereby enabling to meet with any sliding length.

When the slide structure (not shown in the figure) such as the slide door or slide sheet is slid starting from the state shown in FIG. 1, as shown in FIG. 2, the slider 6 moves backward, the upper side part 3a of the wiring harness 3 moves backward integrally with the slider 6 so as to be guided within the wide part 2a of the casing body 2, and the harness supporting member 4 moves backward integrally with the wiring harness 3 so as to stably support the upper side part 3a of the wiring harness 3 within the wide part 2a with surface contact or line contact. The bent part (folded part) 3b of the wiring harness 3 slides between the pair of the guiding plates 34 and 35 of the harness supporting member 4 while the guiding plates 34 and 35 move backward integrally with the bent part 3b and the supporting plate body 7 moves in the same direction integrally with the guiding plates 34 and 35 with supporting the wiring harness 3.

As shown in FIG. 2, when the slider 6 is positioned in the proximity of the step 8 of the casing body 2, the length of the upper side part 3a of the wiring harness 3 becomes approximately the maximum giving a condition that the hanging down or bending of the wiring harness 3 is most likely to occur. However, a front end 7a of the supporting plate body 7 is positioned approximately on the step 8 and a rear end 7b of the supporting plate body 7 is positioned in the proximity of the bent part 3b of the wiring harness 3 (this position always remaining unchanged in the sliding process), so that the supporting plate body 7 stably supports the upper side part 3a of the wiring harness 3 in the wide part 2b of the casing body 2 over the full length of the upper side part 3a of the wiring harness 3. Thereby, the wiring harness 3 is securely prevented from hanging down or bending, so that the sliding motion of the slider 6 is smoothly performed without any interference.

As shown in FIG. 3, when the slider 6 moves to a backward end position starting from the state shown in FIG. 2, the length of the upper side part 3a of the wiring harness 3 is mostly shortened, causing no occurrence of the hanging down of the wiring harness 3, and a lower side part 3c of the wiring harness 3 is extended long along the lower wall 12 of the casing body 2. Since the lower side part 3c of the wiring harness 3 is a part situated on the side of a fixed portion, the lower side part 3c never bends. The supporting plate body 7 of the harness supporting member 4 is positioned in the wide part 2b of the casing body 2 protruding to the front of the slider 6 and the guiding plate 35 is positioned in the proximity of the rear wall 14 of the casing body 2 together with the bent part 3b of the wiring harness 3.

When the slider 6 is moved in the reverse direction (i.e. forward) starting from the state shown in FIG. 3, the length of the upper side part 3a of the wiring harness 3 is increased, the harness supporting member 4 supports the upper side part 3a of the wiring harness 3 over the full length of the upper side part 3a at the middle position shown in FIG. 2 so as to prevent the upper side part 3a from hanging down or bending, so that the slider 6 smoothly moves to the forward end without any interference as shown in FIG. 1.

The movable distance of the bent part 3b of the wiring harness 3, that is, the movable distance of the harness supporting member 4 is half of the movable distance of the slider 6. The position of the slider 6 or that of the bent part 3b of the wiring harness 3 varies according to a linear function. To the contrary, the central position of the upper side part 3a of the wiring harness 3 within the wide part 2b of the casing body 2, that is, the position of the part that tends to hang down or bend most varies according to a quadratic function. Accordingly, the harness supporting member 4 supports the upper side part 3a of the wiring harness 3 approximately over the full length of the upper side part 3a within the wide part 2b of the casing body 2, thereby securely preventing the wiring harness 3 from hanging down or bending.

The hanging down of the upper side part 3a of the wiring harness 3 occurs when the electric power supply device 1 is placed longitudinally as shown in FIGS. 1-3, while the bending of the upper side part 3a of the wiring harness 3 occurs when the electric power supply device 1 is placed laterally. That is, the bending is a concept that includes the hanging down in a broad sense.

The states shown in FIG. 1 and FIG. 3 are states in which the slide structure (not shown in the figure) such as a slide door or slide seat is slid to the forward and backward end positions, respectively. For example, when the electric power supply device 1 is placed longitudinally on a slide door, a harness part 20 situated on the movable side, which is guided out from the slider 6, is arranged on the body side of a vehicle through a passage space, while a harness part 23 situated on the fixed side, which is guided out from the casing body 2, is connected to a wiring harness or auxiliary machine of the slide door by a connector 24. FIG. 1 shows a fully closed state of the slide door situated on the left side of the vehicle, FIG. 2 shows an intermediate state during sliding, and FIG. 3 shows a fully opened state of the slide door.

When the electric power supply device 1 is applied to a slide sheet, for example, when the electric power supply device 1 is placed longitudinally on a floor panel of a vehicle body, a harness part 20 situated on the movable side, which is guided out from the slider 6, is connected to a wiring harness or auxiliary machine situated on the side of the slide sheet, while a harness part 23 situated on the fixed side, which is guided out from the casing body 2, is connected to a wiring harness or auxiliary machine situated on the side of a power source of the vehicle body. FIG. 1 shows a state of a front end (or rear end) position of the slide sheet, FIG. 2 shows an intermediate state of the slide sheet during sliding, and FIG. 3 shows a state of a rear end (or front end) position of the slide sheet.

When the electric power supply device 1 is placed laterally on a vehicle body, a harness part 20, which is guided out from the slider 6, is bent in the thickness direction (upward direction) of the casing and connected to the slide seat. These forms on use are the same in each preferred embodiment explained later on.

In the first preferred embodiment described above, the long hole or long groove as the guiding part 17 for the slider 6 may be provided on the base wall 9 and the cover instead of the upper wall 10 of the casing body 2, and the slider 6 may be provided with a projection or rib which engages with the guiding part of the slider 6, so that a harness part 20 is guided out to the outside from an opening formed on the side of the cover or the base wall 9, or an opening (hole) formed on the upper wall 10 of the casing body. Such a form is the same in each preferred embodiment explained later on. Further, a guiding block having an arc-shaped guiding groove may be used instead of the pair of the guiding plates 34 and 35 of the harness supporting member 4.

Figure 4:
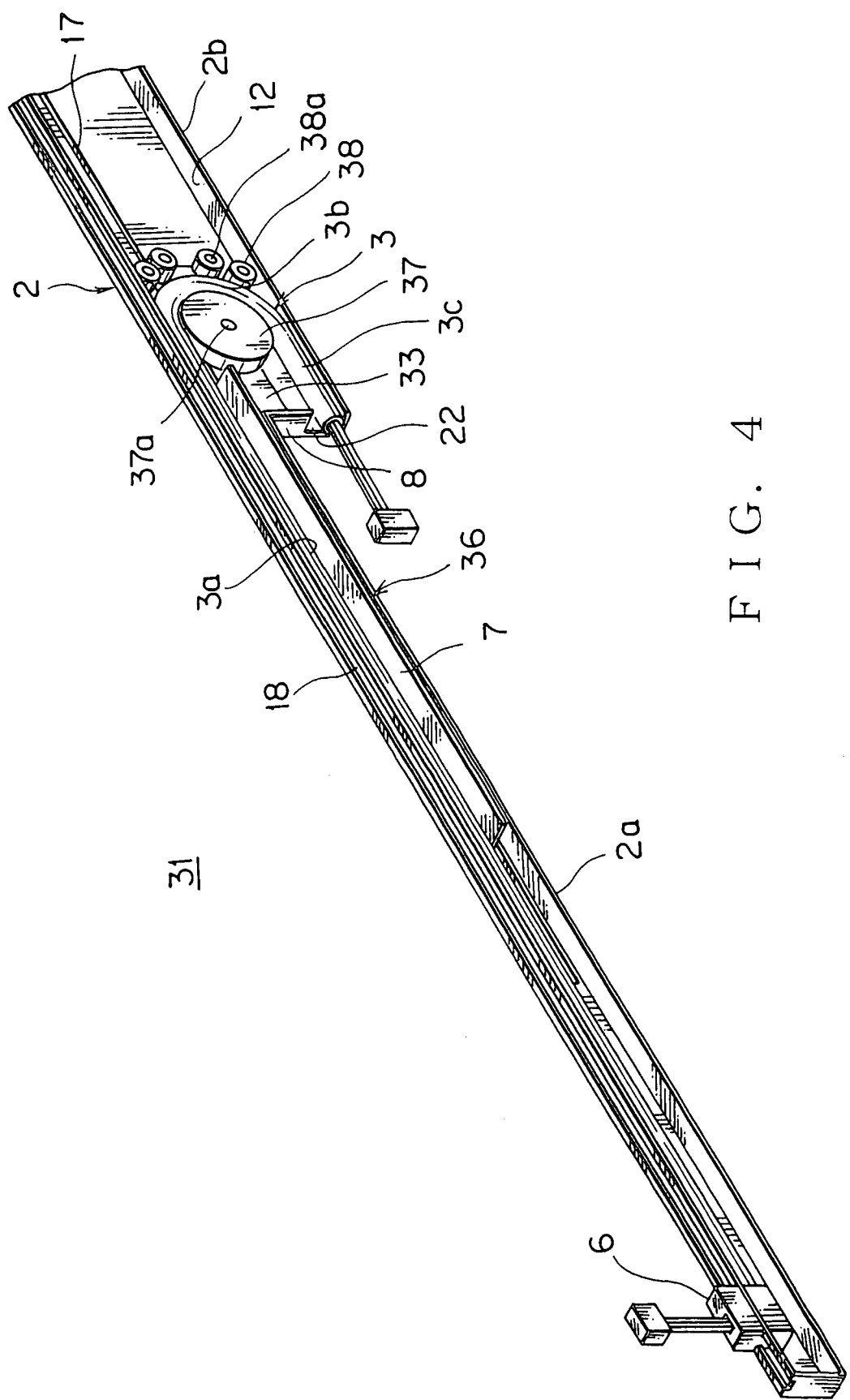
FIG. 4 is a perspective view of an electric power supply device for a slide structure according to the second preferred embodiment of the present invention when the slider is located at a forward end position.
Figure 5:
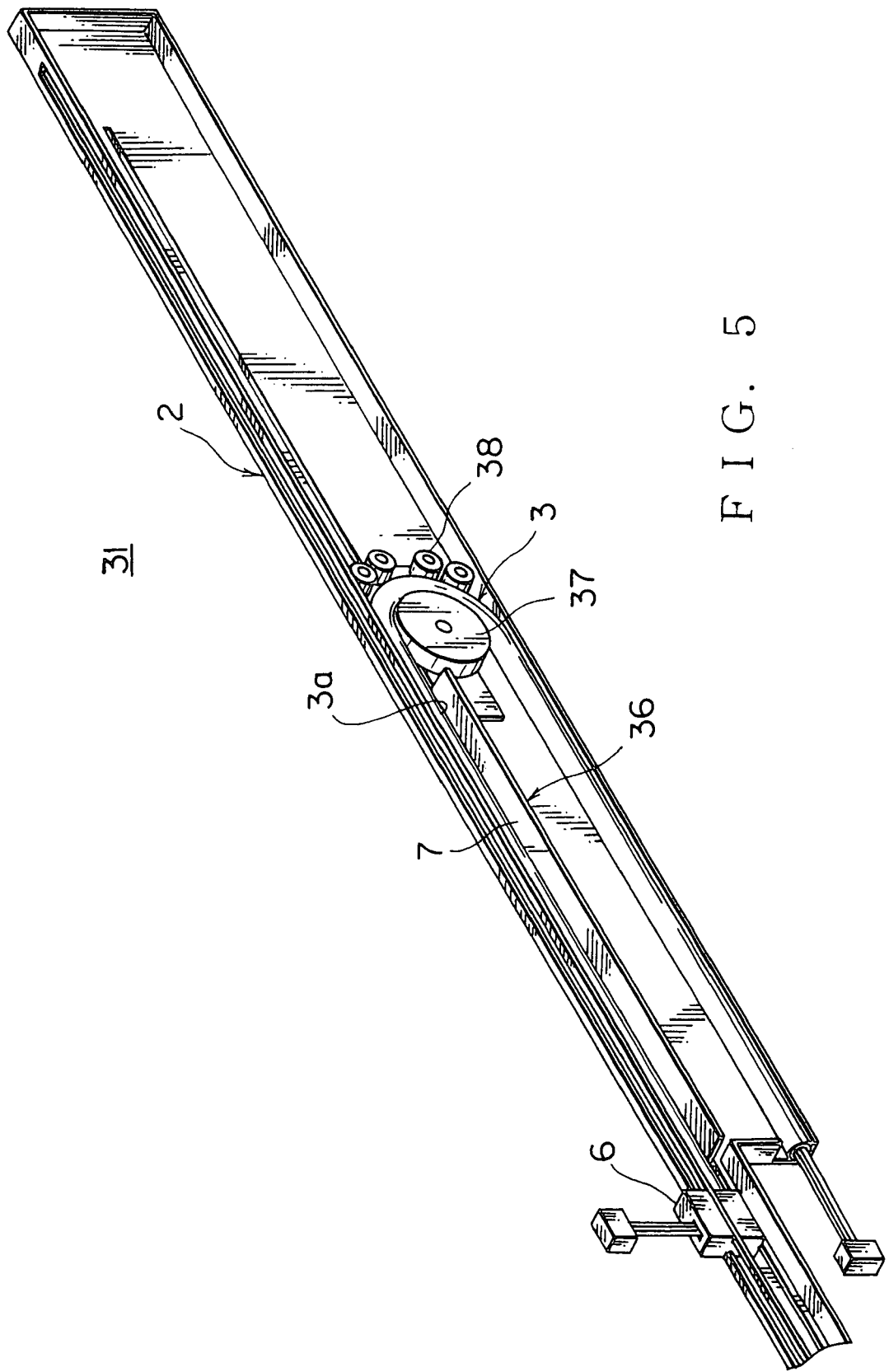
FIG. 5 is a perspective view of the electric power supply device for a slide structure according to the second preferred embodiment when the slider is located at an intermediate position.
Figure 6:
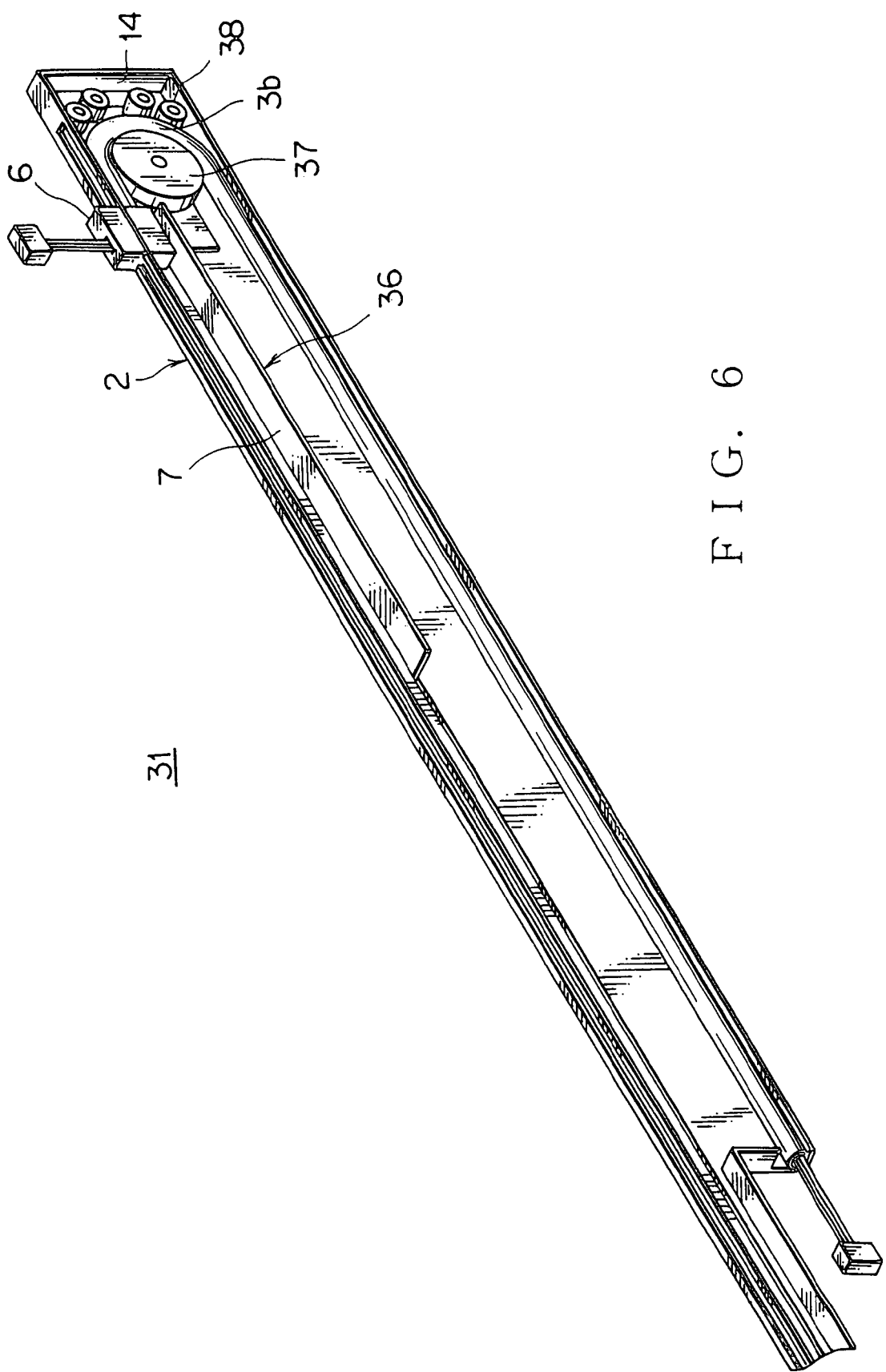
FIG. 6 is a perspective view of the electric power supply device for a slide structure according to the second preferred embodiment when the slider is located at a backward end position.

FIGS. 4-6 illustrate the second preferred embodiment of an electric power supply device for a slide structure according to the present invention.

In an electric power supply device 31 for a slide structure according to the second preferred embodiment, a pulley 37 is disposed along a bent part (i.e. folded part) 3b of a wiring harness 3 and a plurality of small rollers 38 are rotatably provided facing to the pulley 37, in order to reduce sliding resistance between the guiding plates 34, 35 (see FIG. 1) of the harness supporting member 4 and the wiring harness 3 in the first preferred embodiment described above.

The electric power supply device 31 for a slide structure includes: a long casing having a casing body 2 and a cover (not shown in the figure); a wiring harness 3 having a round or elliptic shape in its cross section to be received in the casing being bent in a U or J-shape; a slider 6 which holds an end (movable end) of the wiring harness 3 and is set slidable in the longitudinal direction of the casing along the casing; and a pulley 37 and a plurality of small rollers 38 slidably placed on an inner and outer surface of a bent part 3b of a wiring harness 3, respectively, wherein a supporting plate body 7 supports the wiring harness 3 with surface contact or line contact, so that a harness supporting member 36 slides along the casing.

As shown in FIG. 4, the harness supporting member 36 includes: a horizontal supporting plate body 7 having a rectangular shape or a band plate-shape; a connecting plate 33 continuing to the supporting plate body 7 vertically at a rear end of the supporting plate body 7; a plurality of small rollers 38 rotatably supported and placed forming in an arc-shape on a rear end of the connecting plate 33; and a pulley (i.e. large roller) 37 rotatably supported facing to the small rollers 38 in the middle of the connecting plate 33. The pulley 37 and small rollers 38 are supported by the connecting plates 33 with a center shafts 37a and 38a, respectively. Each peripheral surface of the pulley 37 and small rollers 38 has a width approximately equal to an outer diameter of the wiring harness 3.

The bent part 3b of the wiring harness 3 is slidably engaged being put between the pulley 37 and a plurality of the small rollers 38, and an upper side part 3a of the wiring harness 3 extends to a slider 6 along an upper surface of a supporting plate body 7 while a lower side part 3c of the wiring harness 3 extends to an opening 22 of a step 8 along a lower wall 12 of the casing body 2.

At a forward end position of the slider 6 as shown in FIG. 4, the pulley 37 is located in the proximity of the step 8 within a wide part 2b of the casing body 2, at an intermediate position of the slider 6 during sliding as shown in FIG. 5, the pulley 37 is positioned approximately at a middle in the longitudinal direction of the wide part 2b of the casing body 2 so that the supporting plate member 7 supports approximately the whole length of the upper side part 3a of the wiring harness 3, and at a backward end position of the slider 6 as shown in FIG. 6, each small roller 38 approaches an rear end wall 14 of the casing body 2 while the pulley 37 rotatably supports the bent part 3b of the wiring harness 3 in front of the small rollers 38.

When the slider 6 slides from the state shown in FIG. 4 to the state shown in FIG. 5 or from the state shown in FIG. 5 to the state shown in FIG. 6, the wiring harness 3 is moved integrally with the slider 6. When the wiring harness 3 is moved, the pulley 37 and each small roller 38 rotate in the same direction so as to reduce the sliding resistance between the pulley 37 and each small roller 38 and an inner and outer surfaces of the bent part 3b of the wiring harness 3. The supporting plate body 7 is moved in the same direction integrally with the pulley 37 and small rollers 38, with stably supporting the wiring harness 3.

The reference numeral 18 denotes a slit hole as the guiding part for the slider 6 and the reference numeral 17 denotes a long hole or long groove as the guiding part for engaging a side end of the supporting plate body 7.

In the second preferred embodiment described above, a plurality of small rollers may be placed forming an arc-shape instead of using the pulley 37. Further, a pulley 37 may be placed at an inner side of the bent part 3b of the wiring harness 3 while a guiding plate 35 having an arc-shape (see FIG. 1) in the first preferred embodiment may be placed at an outer side of the bent part 3b of the wiring harness 3. Alternatively, a plurality of small rollers 38 may be placed at an outer side of the bent part 3b of the wiring harness 3 while a guiding plate 34 having an arc-shape (see FIG. 1) in the first preferred embodiment may be placed at an inner side of the bent part 3b of the wiring harness 3.

Further, a semicircular guiding block (not shown in the figure) forming an arc-shaped guiding groove may be used instead of the guiding plates 34 and 35. Further, in the supporting structure of the pulley 37, the connecting plates 33 may support the pulley 37 with a pair of connecting parts on both sides of the pulley 37. Further, the number of the small rollers 38 is not limited to four. Two small rollers 38 may be symmetrically placed at an upper and lower positions beside the bent part 3b of the wiring harness 3 or, alternatively, one small roller 38 may be placed in the middle of the bent part 3b of the wiring harness 3.

Figure 7:
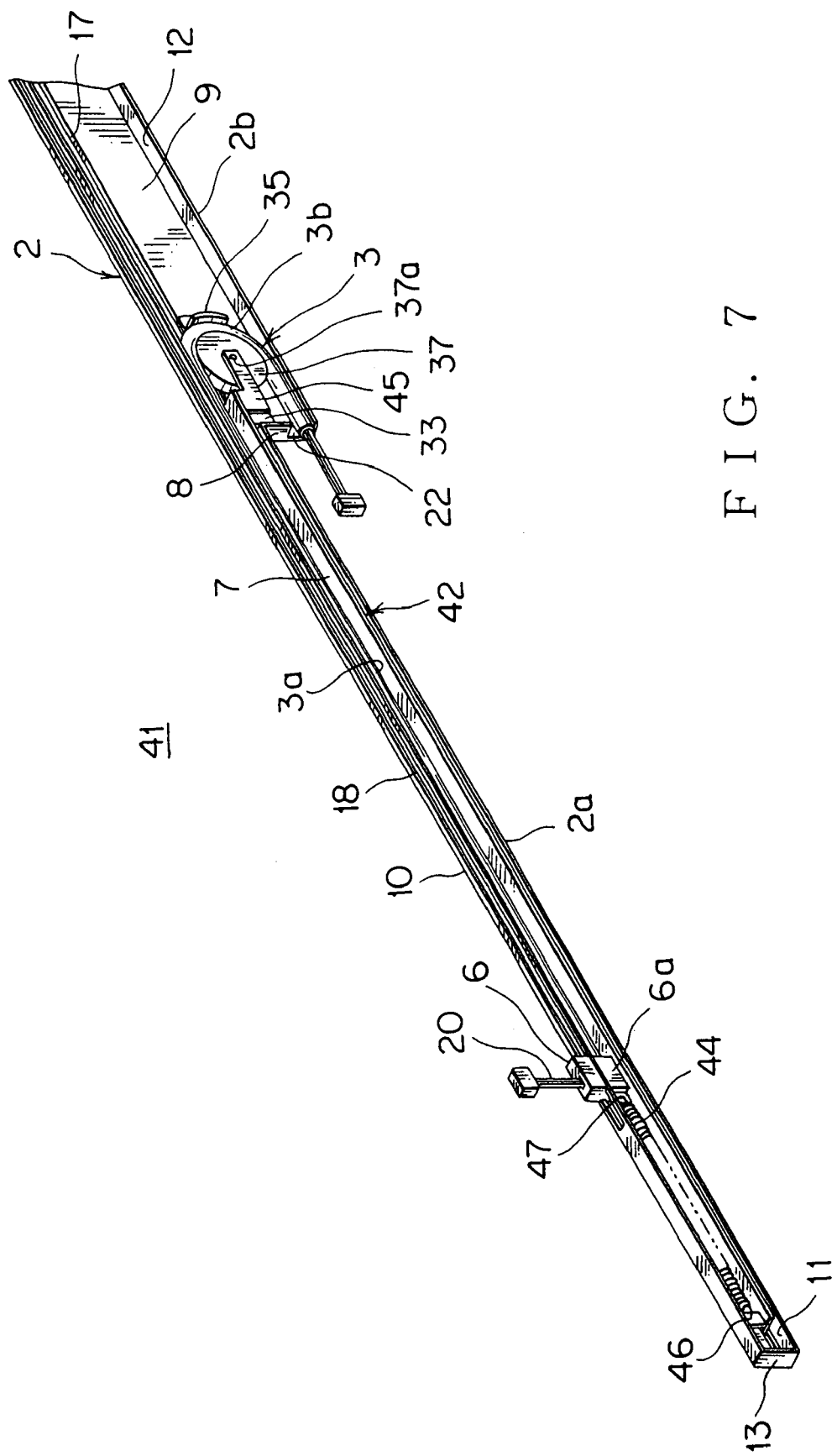
FIG. 7 is a perspective view of an electric power supply device for a slide structure according to the third preferred embodiment of the present invention when the slider is located at a forward end position.
Figure 8:
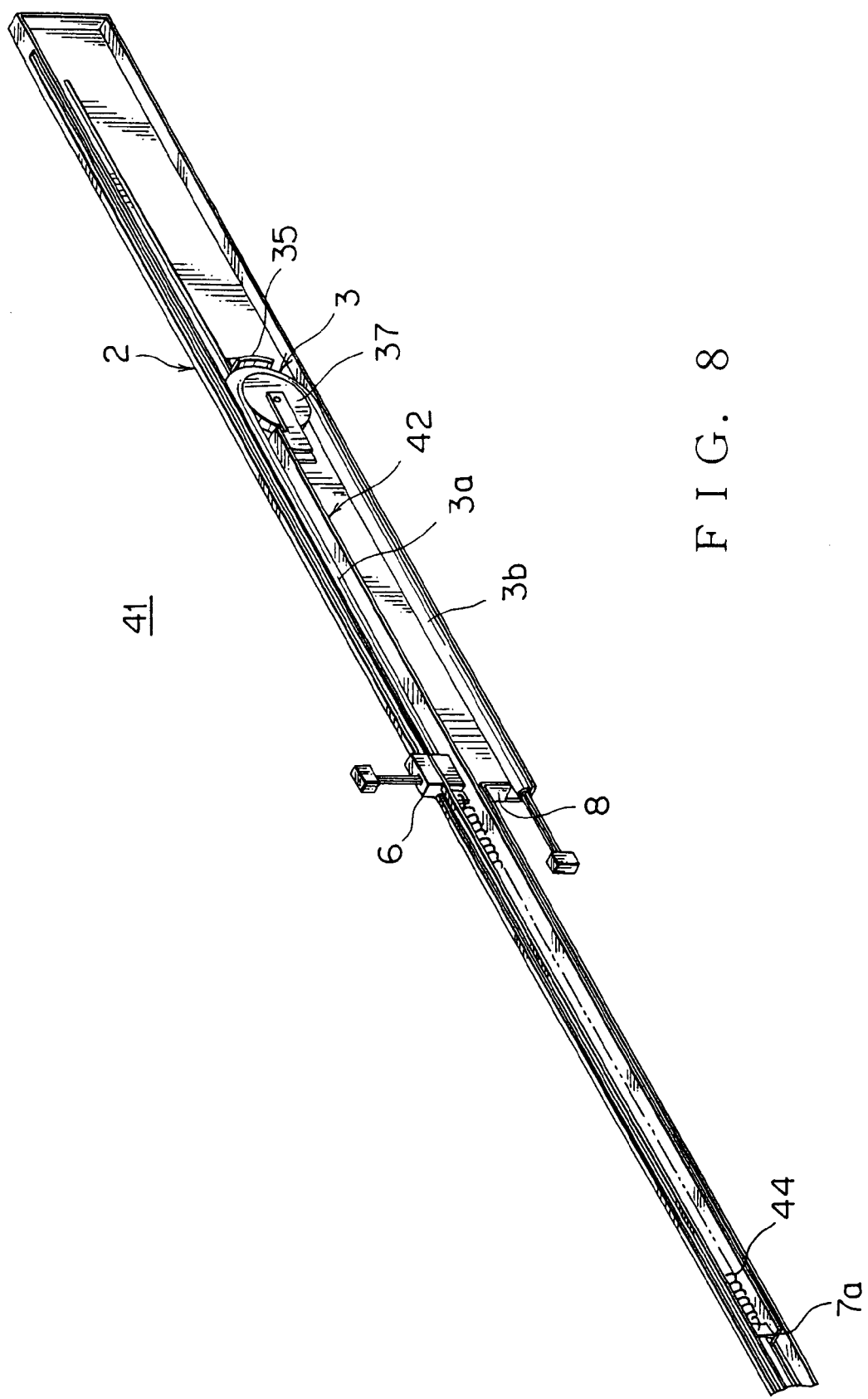
FIG. 8 is a perspective view of the electric power supply device for a slide structure according to the third preferred embodiment when the slider is located at an intermediate position.
Figure 9:
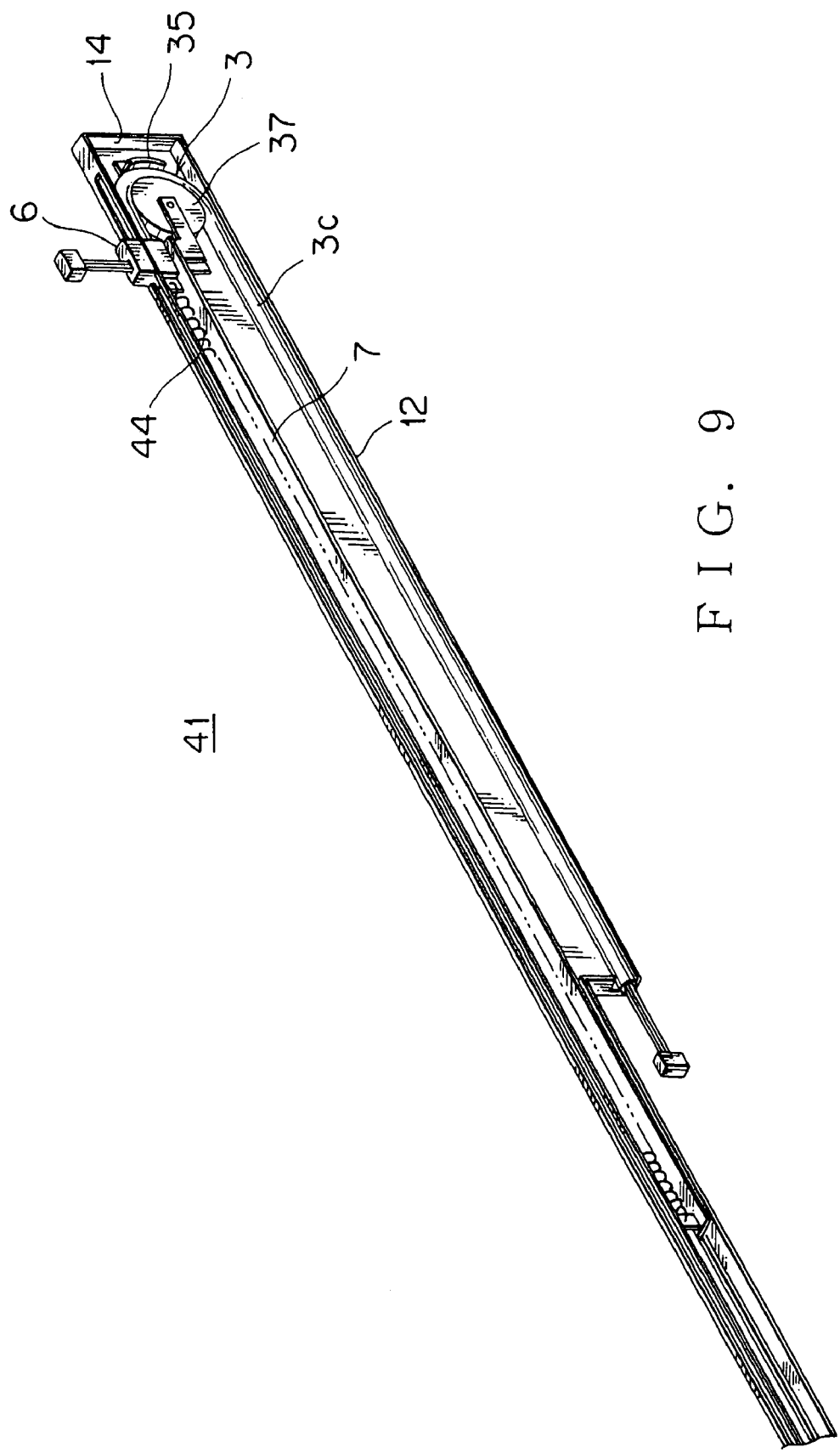
FIG. 9 is a perspective view of the electric power supply device for a slide structure according to the third preferred embodiment when the slider is located at a backward end position.

FIGS. 7-9 illustrate the third preferred embodiment of an electric power supply device for a slide structure according to the present invention.

An electric power supply device 41 for a slide structure includes: a long casing having a casing body 2 and a cover (not shown in the figure); a wiring harness 3 having a round or elliptic shape in its cross section to be received in the casing being bent in a U or J-shape; a slider 6 which holds an end (movable end) of the wiring harness 3 and is set slidable in the longitudinal direction of the casing along the casing; a pulley 37 and a guiding plate 35 slidably placed on an inner and outer surface of a bent part (folded part) 3b of a wiring harness 3, respectively; a harness supporting member 42 slidable along the casing, wherein a supporting plate body 7 supports the wiring harness 3 with surface contact or line contact; and an extension coil spring (extension resilient member) 44 for connecting the supporting plate body 7 to the slider 6.

The bent part 3b of a wiring harness 3 slidably contactually engages with the pulley 37 and the guiding plate 35, so that the harness supporting member 42 can move forward and backward integrally with the wiring harness 3. When the slider 6 moves, the extension coil spring 44 biases the harness supporting member 42 in the moving direction of the slider 6 so as to correctly move the harness supporting member 42 and the wiring harness 3.

As shown in FIG. 7, a center shaft 37a of the pulley 37 is rotatably supported by a vertical connecting plate 33 and a L-shaped connecting piece 45, the connecting plate 33 and connecting piece 45 continues to respective side ends of a rear end of the horizontal supporting plate body 7 crossing at right angles therewith, the supporting plate body 7 is extended long forward in a band plate-shape so that a front end of the supporting plate body 7 is close to a front end wall 13 of the narrow part 2a of the casing body 2. An arc-shaped guiding plate 35 is projectingly formed on an inner surface of the rear end of the connecting plate 33. The harness supporting member 42 includes the supporting plate body 7, connecting plate 33, connecting piece 45, pulley 37 and guiding plate 35.

Brackets 46 and 47 are formed on a front end upper surface of the supporting plate body 7 and on a lower half 6a of the slider 6, respectively, hook parts at respective ends of the extension coil spring 44 are hooked to the brackets 46 and 47, and the extension coil spring 44 approximately has its own free length (a little extended state) at the forward end position of the slider 6 shown in FIG. 7.

In FIG. 7, the reference numeral 18 denotes a slit hole as the guiding part for the slider 6, the reference numeral 17 denotes a long groove or long hole as the guiding part for the supporting plate body 7, the reference numeral 22 denotes an opening situated on the harness-fixing side, and the reference numerals 8 and 11-14 denote respective walls as peripheral walls of the casing body 2.

At a forward end position of the slider 6 as shown in FIG. 7, the pulley 37 is positioned on a front end of the wide part 2b of the casing body 2, the supporting plate body 7 of the harness supporting member 42 is positioned in a range from the pulley 37 to a front end of the narrow part 2a of the casing body 2, the slider 6 is positioned on a front half of the supporting plate body 7, the extension coil spring 44 is positioned along an upper surface of a front half of the supporting plate body 7, and an upper side part 3a of the wiring harness 3 is extended long within the narrow part 2a of the casing body 2 and stably supported by the upper surface of the supporting plate body 7 for the whole length of the upper side part 3a.

When the slider 6 moves backward starting from the state shown in FIG. 7, as shown in FIG. 8, the extension coil spring 44 is extended so as to enlarge the distance between the slider 6 and a front end 7a of the harness supporting member 42. The upper side part 3a of the wiring harness 3 moves backward integrally with the slider 6. When the slider 6 is positioned in the proximity of the step 8 of the casing body 2, the pulley 37 is positioned approximately at the center of the wide part 2b of the casing body 2.

The harness supporting member 42 including the pulley 37 is resiliently biased backward, that is, in the moving direction of the slider 6 relatively to the slider 6 with restoring force due to compression of the extension coil spring 44, so that the pulley 37 presses the bent part 3b of the wiring harness 3 forward. Thereby, the upper side part 3a of the wiring harness 3 is supported between the slider 6 and the pulley 37 in its stretched condition without bending, that is, the wiring harness 3 is securely prevented from hanging down or being bent. The upper side part 3a of the wiring harness 3 is securely supported by an upper surface of a rear half of the supporting plate body 7 with surface contact or line contact. Thus, the slider 6 can move smoothly without any interference.

When the slider 6 further is moved backward from the state shown in FIG. 8 and positioned at a backward end as shown in FIG. 9, the pulley 37 is close to a rear end wall 14 of the casing body 2. The supporting plate body 7 extends from the wide part 2b of the casing body 2 to a rear half of the narrow part 2a, the extension coil spring 44 is most extended so as to bias the pulley 37 backward and support the lower side part 3c of the wiring harness 3, which runs from the pulley 37 along a lower wall 12 of the casing body 2, in its straightly stretched state without slack. A harness part 20 to be guided out to the outside from the slider 6 is preferably covered with a rigid protector or the like so that each electric wire is not affected by tensile stress during the movement.

When the slider 6 moves forward from the state shown in FIG. 9, the upper side part 3a of the wiring harness 3 is gradually extended, the whole length of the extension coil spring 44 is gradually shortened, the pulley 37 is resiliently biased backward so as to press the upper side part 3a of the wiring harness 3 backward and gradually extend the upper side part 3a in its stretched state. Thus, the slider 6 is smoothly moved from its intermediate position shown in FIG. 8 to its forward end position shown in FIG. 7.

In the third preferred embodiment described above, an arc-shaped guiding plate 34 (see FIG. 1) of the first preferred embodiment may be used instead of the pulley 37. A plurality of small rollers 38 (see FIG. 4) of the second preferred embodiment may be used instead of the rear guiding plate 35 shown in FIG. 7. Further, a resilient member such as elastic cord may be used instead of the extension coil spring 44.

In each preferred embodiment described above, the narrow part 2a of the casing body 2 may be a wide part, which continues to the wide part 2b of the latter half with the same plane. In such a case, the opening 22 for guiding out the harness is provided in the middle of the lower wall of the casing body 2 or on the front end wall. Further, if the stroke can be shortened a little, the narrow part 2a of the casing body 2 may be eliminated, that is, the casing body 2 may be constructed only by the wide part 2b. In this case, the electric power supply device for a slide structure can be used as a long sliding device.

In each preferred embodiment described above, as shown in FIG. 10, the horizontal supporting plate body 7 of the harness supporting member 4 is slidably engaged with the base wall 9 of a casing C consisting of the casing body 2 and the cover 5 or with the guiding groove (guiding part) 17 of the cover wall 15. However, instead, like an electric power supply device 51 for a slide structure as shown in FIG. 11, an upper or lower end of the harness supporting member 4' may be slidably engaged with an upper wall 10' as a wall on the short side of the wide part 2b of a casing C' or with a guiding rail (guiding part) 50, 52 provided on the side of a lower wall 12. The construction of the electric power supply device 51 shown in FIG. 11 except the sliding structure is the same as the construction of the electric power supply device 1, 31 or 41 in each preferred embodiment.

Figure 10:
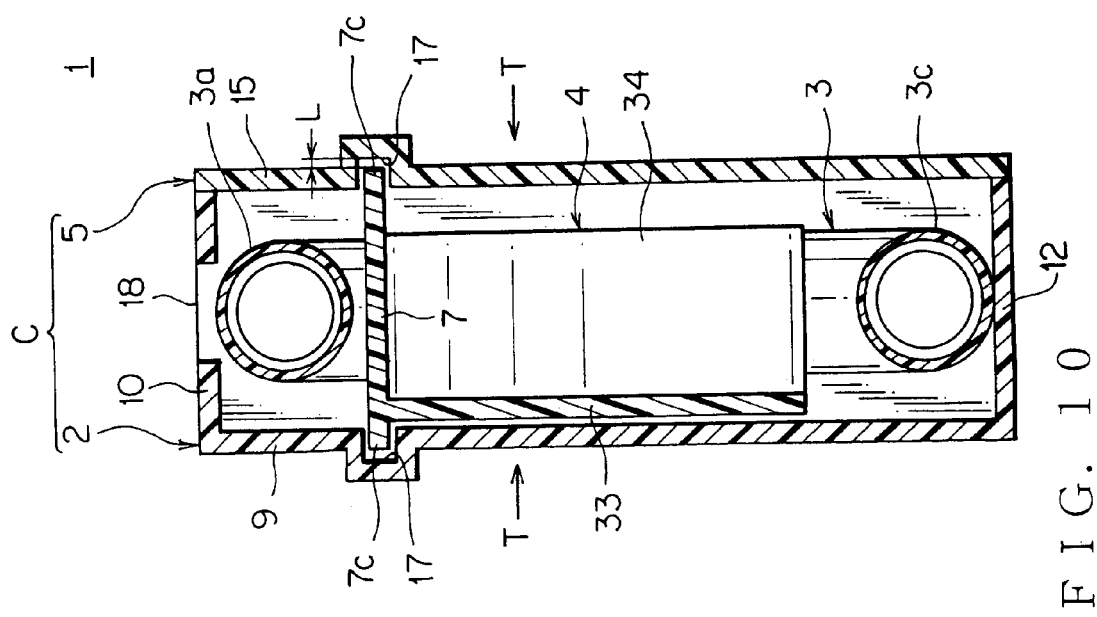
FIG. 10 is a cross sectional view taken along 10-10 line in FIG. 2 illustrating a preferred embodiment of a slide structure of a harness supporting member and casing in the electric power supply device.
Figure 11:
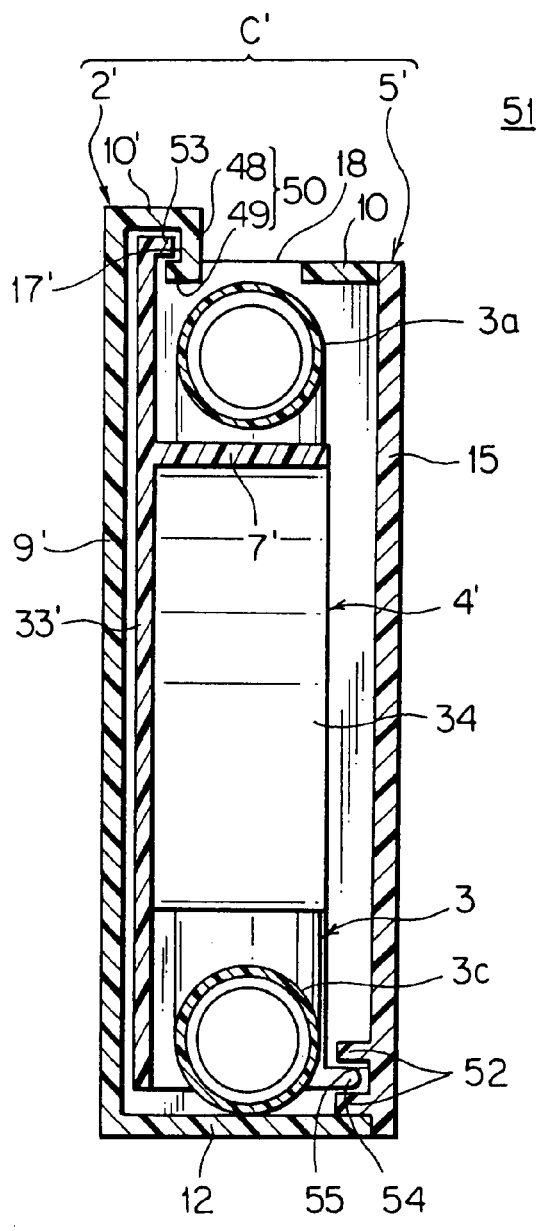
FIG. 11 is a longitudinal cross sectional view illustrating another preferred embodiment of a slide structure of a harness supporting member and casing.

In the structure shown in FIG. 10, a gap size L between a side end 7c of the horizontal supporting plate body 7 and a bottom surface of the guiding groove 17 must be secured to a certain extent. In the event that the casing C is strongly pressed (crushed) from the outside in its thickness direction (i.e. direction of arrow T), the sliding resistance between the supporting plate body 7 and the guiding groove 17 is increased, causing that the harness supporting member 4 could not slide smoothly. However, with the sliding structure shown in FIG. 11, even if the casing C' is affected by an external force being strongly pressed in its thickness direction, since the bending of the wall on the short side such as the upper wall 10' or lower wall 12 of the casing C' due to such an external force is very small, therefore the harness supporting member 4' can smoothly slide without being affected by an external force.

In FIG. 10, the reference numeral 33 denotes a vertical connecting plate, the reference numeral 34 denotes a guiding plate, the reference numeral 10 denotes an upper wall, the reference numeral 12 denotes a lower wall, the reference numeral 18 denotes a long hole for engaging with the slider 6, the reference numeral 3 denotes a wiring harness 3, the reference numeral 3a denotes an upper side part of the wiring harness, and the reference numeral 3c denotes a lower side part of the wiring harness.

FIG. 11 shows a structure at approximately the same position corresponding to that shown in FIG. 10, in which a guiding rail 50 having a L-shape in section is formed rising up from an upper wall 10' of the casing body 2', the guiding rail 50 consists of a vertical base 48 and a horizontal end 49, the base 48 is positioned parallel to a base wall 9' of the casing body 2', the end 49 is positioned parallel to the upper wall 10' toward a base wall 9', and a guiding groove 17' is formed between the upper wall 10' and the end 49. The base 48 is adjacent to a long hole 18 (guiding part for the slider 6) of the upper wall 10'. The end 49 is flush with the long hole 18 and an upper wall 10 adjacent to the long hole 18, which upper wall 10 is situated in the proximity of a cover 5'.

In FIG. 11, the guiding rails 50 and 52 are straightly formed along the longitudinal direction of the wide part 2b of the casing C' approximately for the whole length of the wide part 2b.

In FIG. 11, the harness supporting member 4' includes a horizontal supporting plate body 7' having a belt-shape and a vertical connecting plate 33' which integrally continues to a rear end of the supporting plate body 7' in both upward and downward directions crossing at right angles with the supporting plate body 7'. The connecting plate 33' is positioned along and parallel to the base wall 9' in a range approximately from an upper end to a lower end of an inner surface of the base wall 9' of the casing body 2'. The supporting plate body 7' crosses at right angles with a middle of the connecting plate 33' in the height direction. A horizontal slide engaging part 53 having a rail-shape is integrally provided to an upper end of the connecting plate 33' inwardly crossing at right angles therewith. The slide engaging part 53 is slidably engaged with a guiding rail 50 of the casing body 2'.

A horizontal slide engaging part 54 is also provided at a lower end of the connecting plate 33'. A guiding rail (guiding part) 52 is provided at a lower end of a cover 5'. The slide engaging part 54 is integrally formed, for example, with the rear guiding plate 35 (see FIG. 2) to have its stiffness. A pair of guiding rails 52 is projectingly formed from an inner surface of the cover 5'. A horizontal guiding groove 55 is formed between the pair of the guiding rails 52.

The lower guiding rail 52 may be formed on the casing body 2' instead of the cover 5'. In this case, the guiding rail 52 and the slide engaging part 54 may be formed on the base wall 9' instead of the cover 5'. Further, the lower guiding rail 52 and the slide engaging part 54 may be eliminated. Alternatively, eliminating the lower guiding rail 52, the lower horizontal slide engaging part 54 having a rib-shape, as the sliding part, may be set slidably contactually engaged with an inner surface of the vertical cover wall 15 of the cover 5'. The shape of the guiding rails 50, 52 and that of the slide engaging parts 53, 54 can be changed according to need.

In any case, the guiding rails 50, 52 and the slide engaging parts 53, 54 are not arranged in the middle of the casing C' in its height direction (i.e. in the middle of the wall 9' or the wall 15 situated on the long side of the casing C') but arranged in the proximity of the wall 10' or the wall 12, which is situated on the short side of the casing C', so that the harness supporting member 4' can smoothly slide even if the casing C' is pressed by external force or the like in its crushing direction.

In FIG. 11, the reference numeral 3 denotes a wiring harness, the reference numeral 3a denotes an upper side part of the wiring harness, the reference numeral 3c denotes a lower side part of the wiring harness, and the reference numeral 34 denotes a front guiding plate. The preferred embodiment shown in FIG. 11 can also be applied to the embodiment shown in FIG. 4 or FIG. 7 besides the embodiment shown in FIG. 2.

Figure 12:
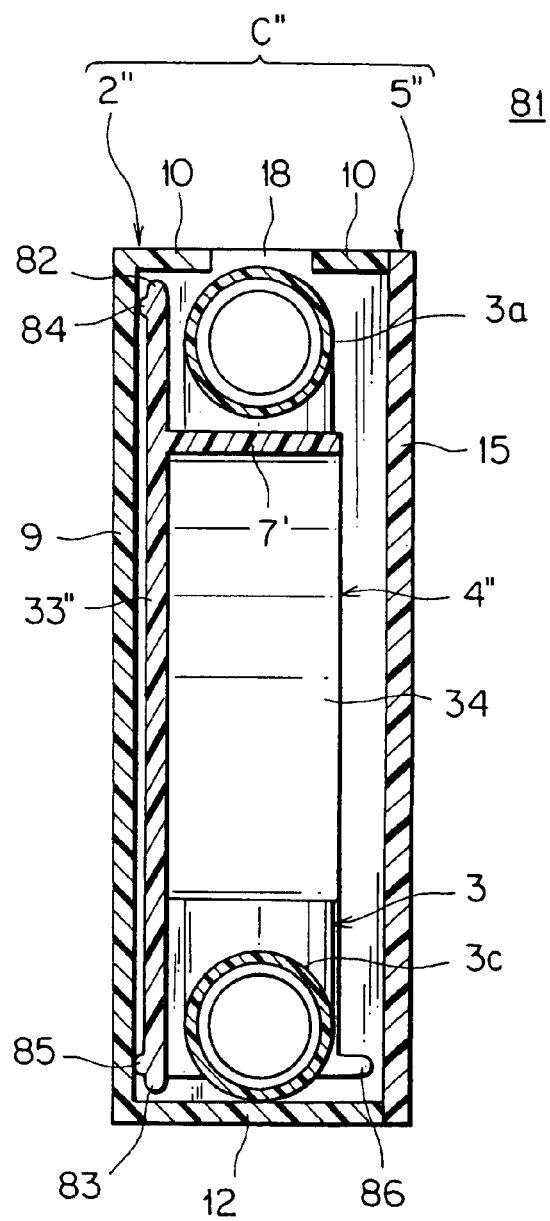
FIG. 12 is a longitudinal cross sectional view illustrating a further preferred embodiment of a slide structure of a harness supporting member and casing.
Figure 15:
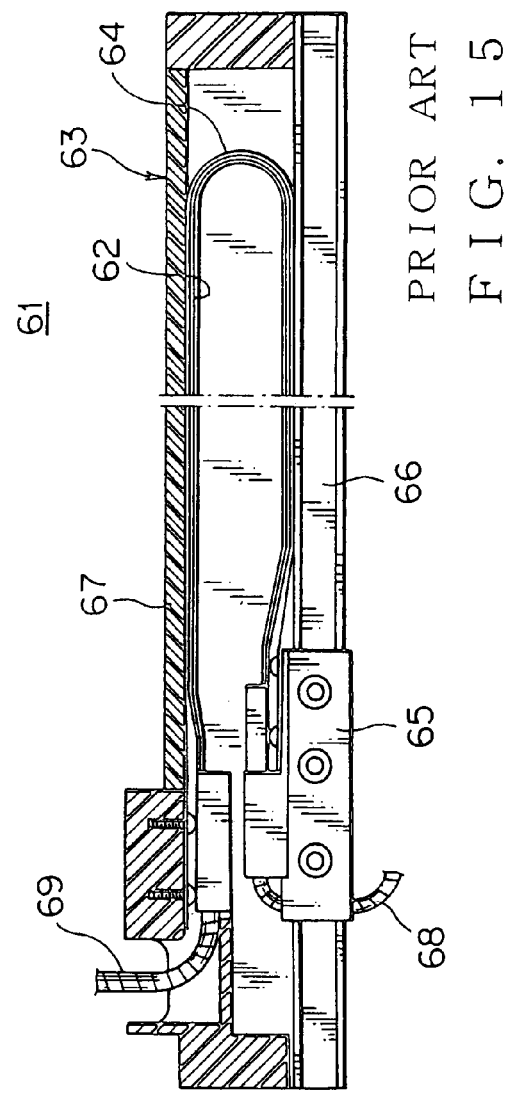
FIG. 15 is a cross sectional view illustrating an example of a conventional electric power supply device.
Figure 16:
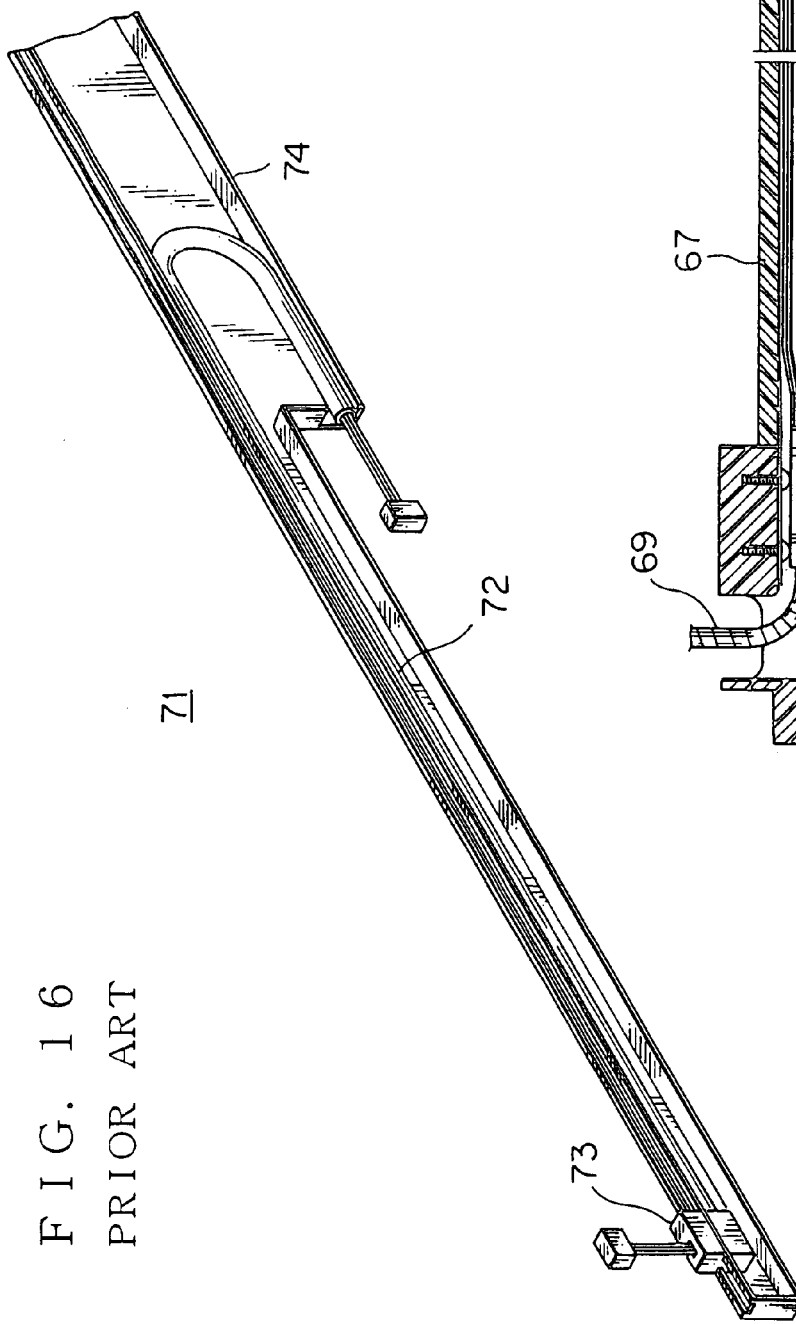
FIG. 16 is a perspective view illustrating a conventional electric power supply device for a slide structure.
Figure 17:
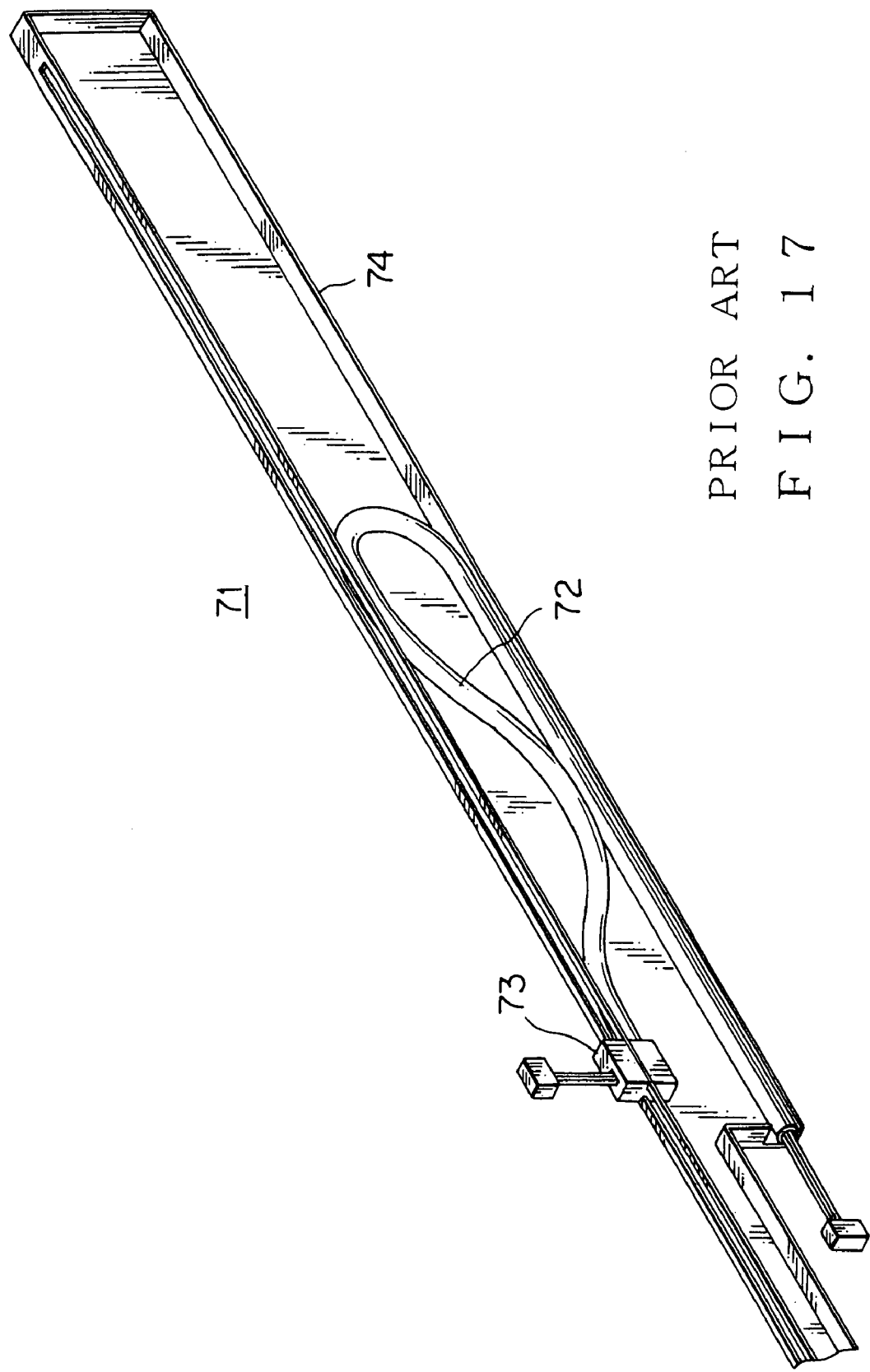
FIG. 17 is a perspective view illustrating a process in a problem of a conventional electric power supply device for a slide structure.
Figure 18:
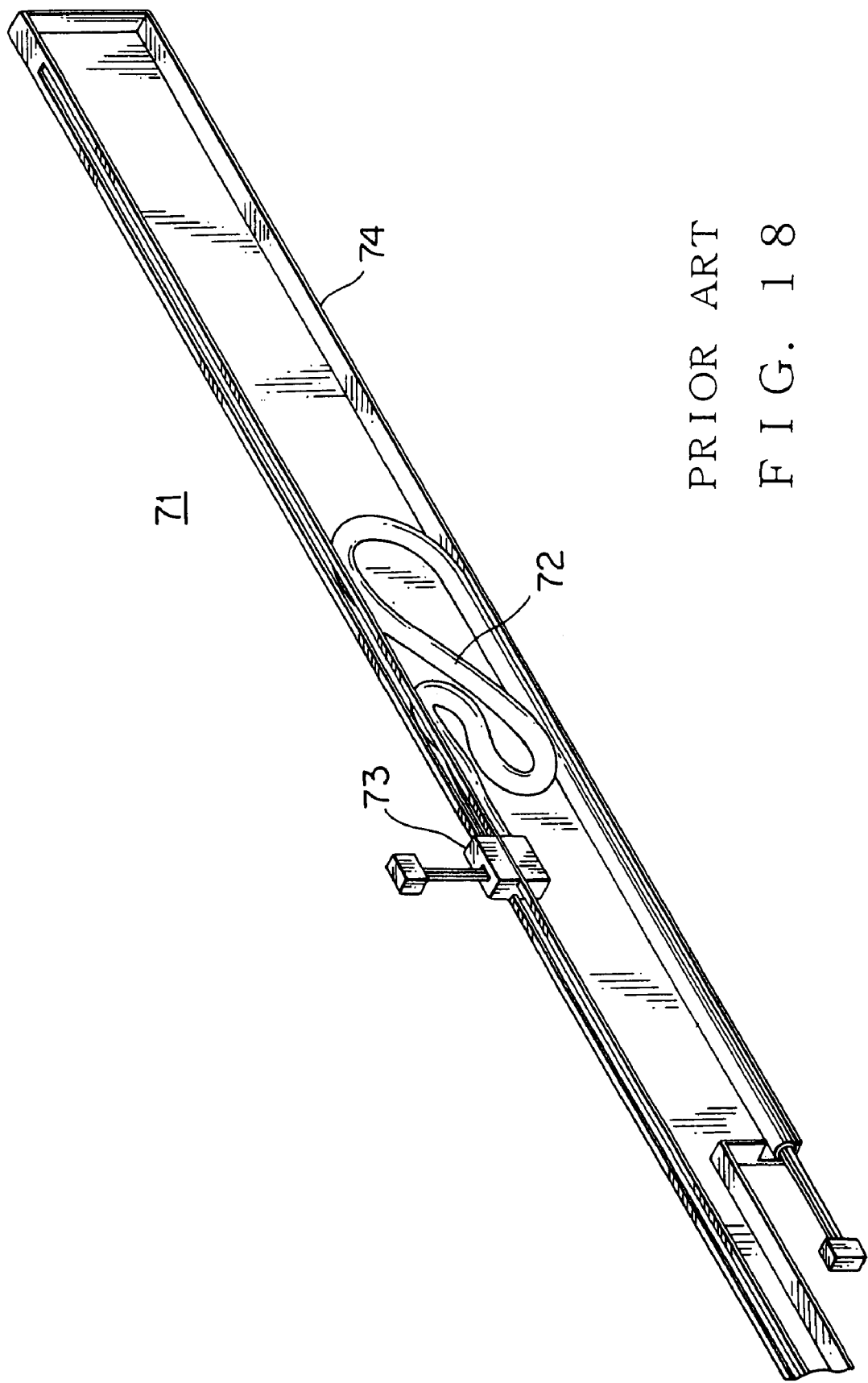
FIG. 18 is a perspective view illustrating a problem of a conventional electric power supply device for a slide structure.

FIG. 12 shows an electric power supply device 81 for a slide structure, in which the guiding rails 50 and 52 shown in FIG. 11 are eliminated and the harness supporting member 4' is provided with sliding parts 82-86 having a rib-shape or plate-shape.

In the electric power supply device 81, an upper wall 10 of a casing body 2" is flush with an upper wall 10 of a cover 5". A long hole 18 is situated between both walls 10. A harness supporting member 4" includes a vertical connecting plate 33" which is long up and down and a horizontal supporting plate body 7' which crosses at right angles with the connecting plate 33". The connecting plate 33" is formed a little shorter than a distance between a lower wall 12 and an upper wall 10 of a casing C". An upper and lower ends of the connecting plate 33" are the sliding parts 82 and 83 having an arc-shape in section, respectively. The sliding parts 84 and 85 having a rib-shape are projectingly formed sideward on a vertical outer side surface of the connecting plate 33" in the proximity of the sliding parts 82 and 83, respectively. The sliding parts 84 and 85 have a semicircular shape or an arc-shape. Each of sliding parts 82-85 extends in a rib-shape or plate-shape in the longitudinal direction of the casing C".

The sliding parts 82 and 83 project in a direction crossing at right angles with the projecting direction of the sliding parts 84 and 85. Each sliding part has an arc-shaped smooth end face, which can smoothly slide contacting with corresponding inner surface of the wall 10, 12 or an inner surface of the base wall (base) 9 with line contact.

A sliding part 86 having a similar shape as that of the slide engaging part 54 shown in FIG. 11 is projectingly formed horizontally at a lower end opposite to the connecting plate 33" of the harness supporting member 4". An end of the sliding part 86 is a smooth face having an arc-shape in section. The end face of the sliding part 86 is positioned in the proximity of an inner surface of the vertical cover wall (base) of the cover 5" having a little gap therebetween and can slide smoothly contacting with the cover wall 15 with line contact.

The sliding parts may have a projection-shape instead of a rib-shape or a plate-shape. It may be possible to form a plurality of sliding parts each having a projection-shape in a line. Alternatively, the sliding parts 82 and 83 may be formed in a plate-shape while the sliding parts 84, 85 and 86 may be formed in a projection-shape.

In any case, each of the sliding parts 82-86 of the harness supporting member 4" is arranged in the proximity of a corner of the upper and lower ends of the casing C". Therefore, even if external force is applied to the base wall 9 or cover wall 15 of the casing C" in the thickness direction (i.e. crushing direction) of the casing C", the harness supporting member 4" can smoothly slide without being affected by the external force.

In FIG. 12, the reference numeral 3 denotes a wiring harness, the reference numeral 3a denotes an upper side part of the wiring harness, the reference numeral 3c denotes a lower side part of the wiring harness, and the reference numeral 34 denotes a guiding plate. The embodiment shown in FIG. 12 is a section structure at approximately the same position as that of the embodiment shown in FIG. 10. The construction of the electric power supply device 81 shown in FIG. 12 except the sliding structure is the same as the construction of the electric power supply device 1, 31 or 41 in each preferred embodiment. The preferred embodiment shown in FIG. 12 can also be applied to the embodiment shown in FIG. 4 or FIG. 7 besides the embodiment shown in FIG. 2.

Figure 13:
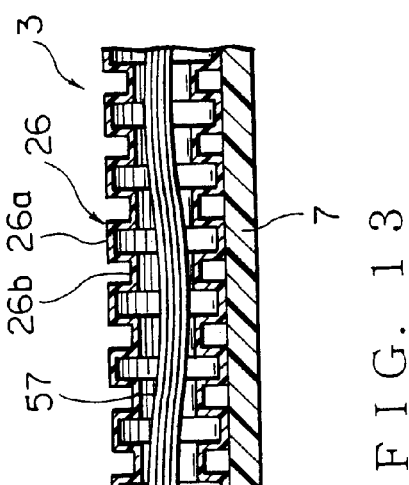
FIG. 13 is a longitudinal cross sectional view illustrating an example of a contact form between a wiring harness and a harness supporting member.

In each preferred embodiment described above, a corrugated tube 26 made of synthetic resin is used as a protecting tube which covers electric wires 57 of the wiring harness 3. As shown in FIG. 13, the contact between the corrugated tube 26 and the supporting plate body 7 of the harness supporting member 4 is surface contact by an outer peripheral surface of a ridge 26a of the corrugated tube 26.

Figure 14:
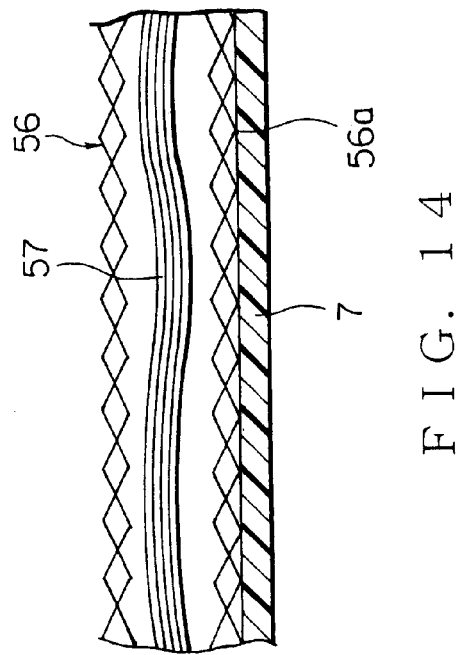
FIG. 14 is a longitudinal cross sectional view illustrating another example of a contact form between a wiring harness and a harness supporting member.

However, due to the surface contact of the protecting tube 26, the sliding resistance (i.e. friction) between the wiring harness 3 and the supporting plate body 7 or the guiding plate 34, 35 (see FIG. 1) is increased. For the purpose of solving this problem, as shown in FIG. 14, a net tube (i.e. braided tube) 56 made of synthetic resin is used as the protecting tube, thereby reducing the contact area with point contact or line contact between a net part 56a on a surface-side of the net tube 56 and the supporting plate body 7 and reducing the sliding resistance, so that the wiring harness 3 can smoothly slide contacting with the harness supporting member 4 with small friction. Due to the point contact or line contact of the protecting tube 56, the slider 6 can smoothly slide, that is, the slide door can smoothly move.

The net tube 56 is a known product, in which fibers made of synthetic resin are woven or integrated in a net of fine meshes so that a top part 56a of a plurality of the net parts of fine meshes comes in contact with a surface of the supporting plate body 7 with point contact or line contact. The net tube 56 has excellent flexibility in comparison with the corrugated tube 26. The net tube 56 has less stiffness than that of the corrugated tube 26. For example, the net tube 56 is unsuitable for a part which might have interference with the outside, however, the net tube 56 is well usable if it is used within the casing C.

In FIG. 14, only the net tube 56 is used as the protecting tube. However, for example, a net tube may be used by covering the corrugated tube 26 therewith. In this case, the corrugated tube 26 may be provided over approximately the whole length of the wiring harness. Alternatively, the corrugated tube 26 may be provided on a portion which is guided out to the outside from the casing C. In any case, the sliding operation can be improved due to small friction sliding of the net tube 56. The structure of the protecting tube as described above can be applied in each embodiment shown in FIG. 4, FIG. 7 or FIG. 11 besides the embodiment shown in FIG. 1.

What is claimed is:

1. An electric power supply device for a slide structure comprising:
   a casing which receives a wiring harness folded in a U-shape;
   a slider which holds a movable end of the wiring harness and slidably engages with the casing; and
   a harness supporting member which slidably contractually engages with a folded part of the wiring harness and includes a supporting plate body for supporting an inner side face of the wiring harness,
   wherein a part of the harness supporting member, which slidably contractually engages with the folded part of the wiring harness, includes a pulley.

2. The device according to claim 1, wherein the part of the harness supporting member, which slidably contractually engages with the folded part of the wiring harness, consists of a pulley and at least one small roller facing with the pulley.

3. The device according to claim 1, wherein the part of the harness supporting member, which slidably contractually engages with the folded part of the wiring harness, consists of a pulley and a guiding plate facing with the pulley.

4. The device according to claim 1, wherein an extension resilient member is arranged between the supporting plate body and the slider.

5. The device according to claim 1, wherein an outer periphery of the wiring harness is covered with a net tube that comes in point contact or line contact with the supporting plate body.

* * * * *